Patented Aug. 19, 1952

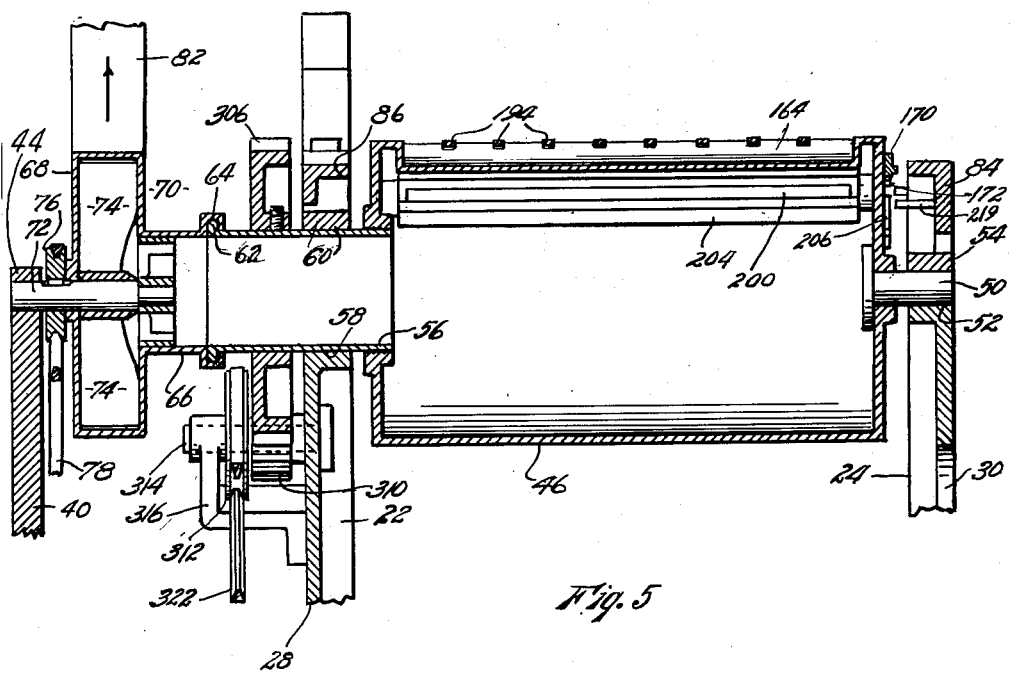
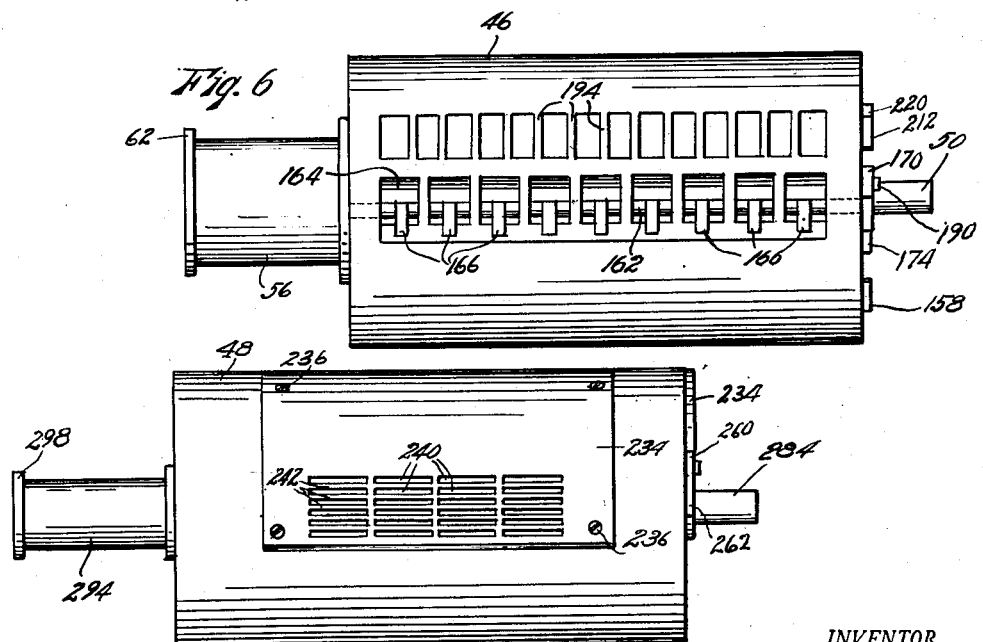

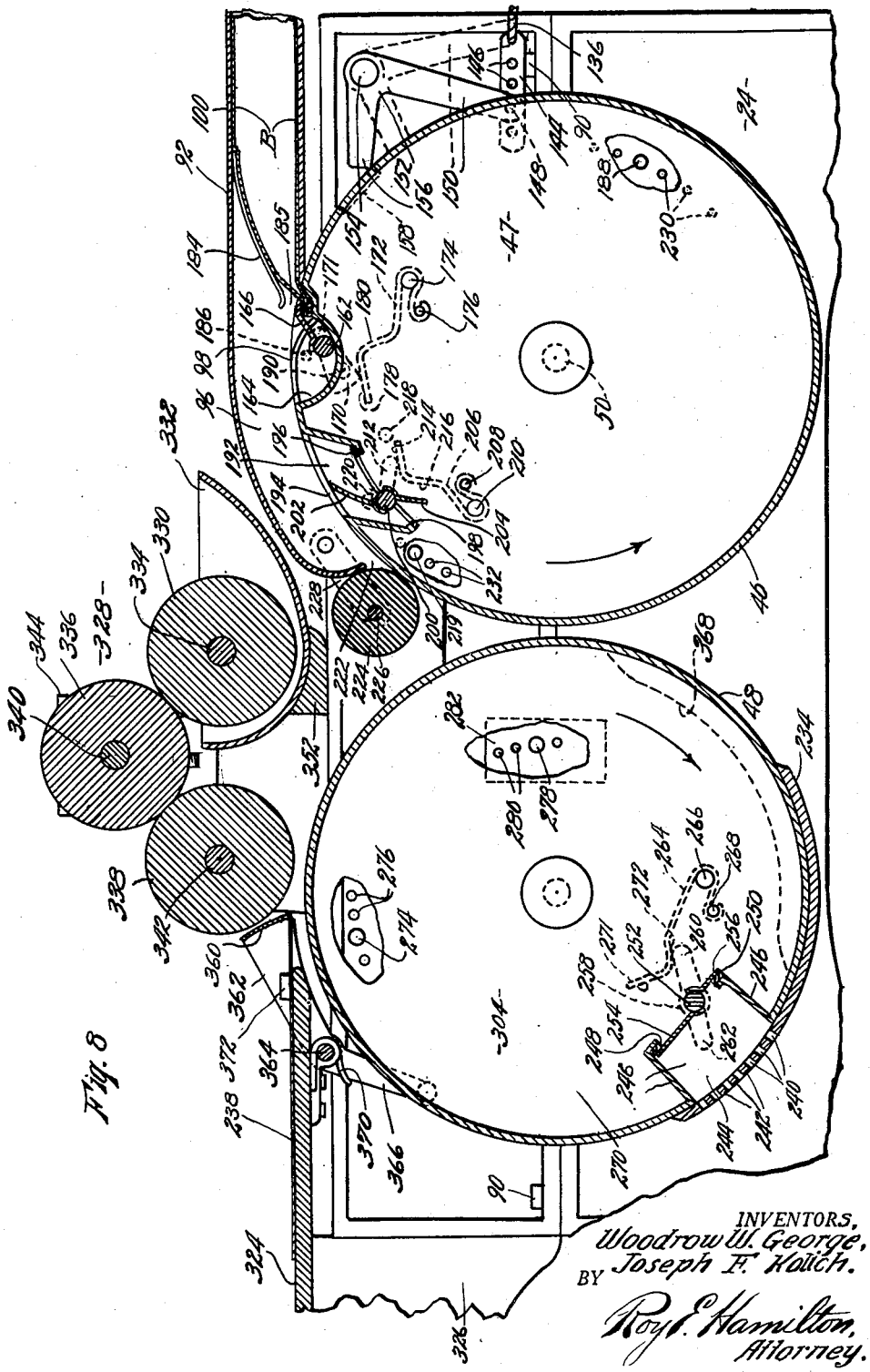

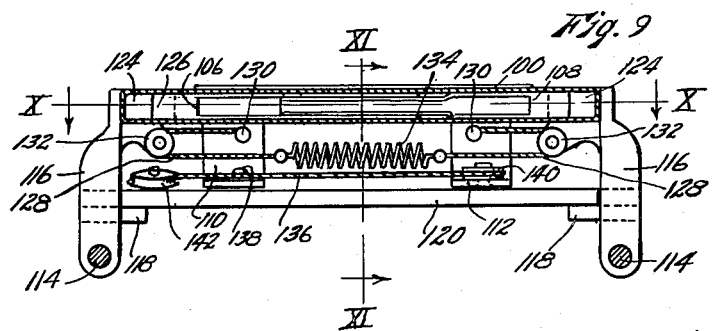
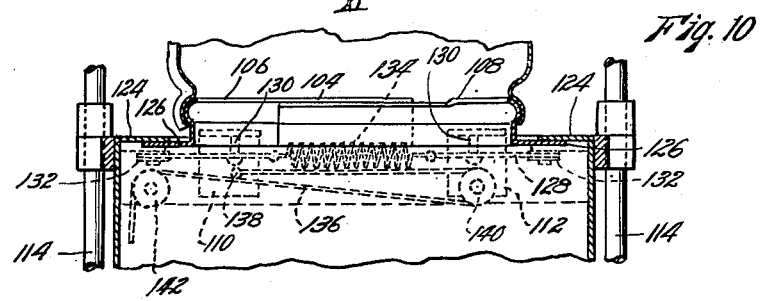
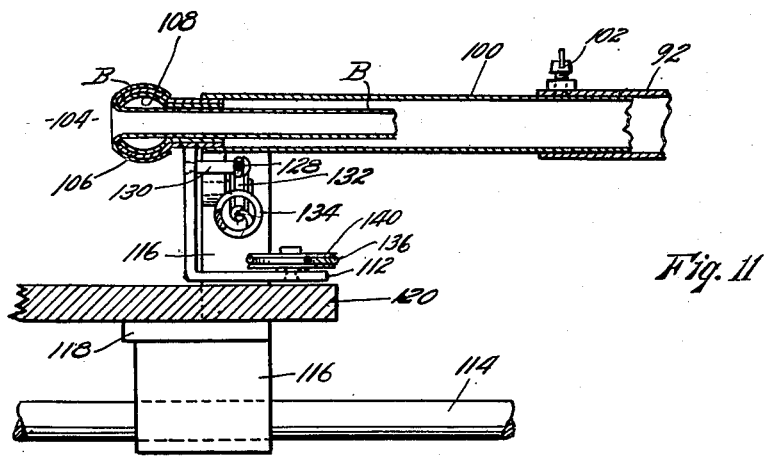
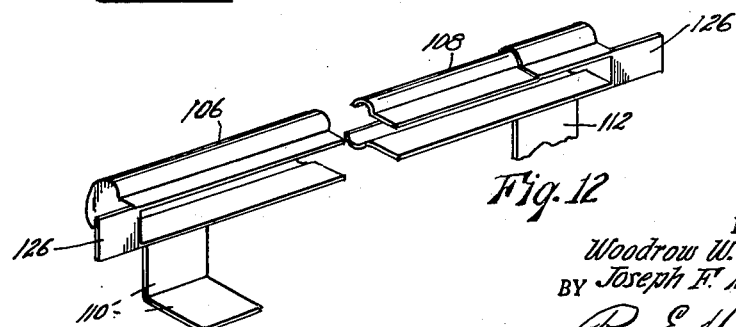

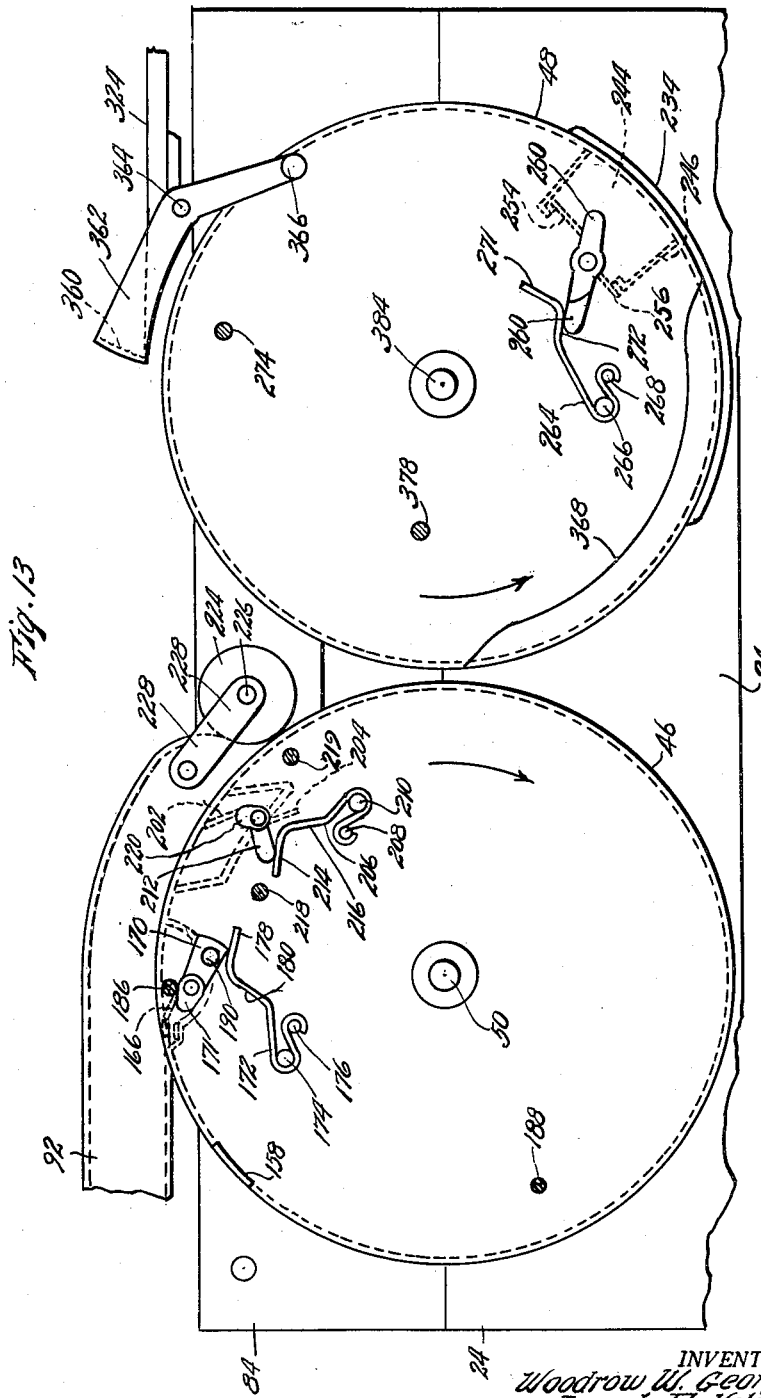

2,607,506

UNITED STATES PATENT OFFICE 2,607,506

BAG TURNER AND LABELER

Woodrow W. George, Kansas City, Kans., and Joseph F. Kolich, Kansas City, Mo., assignors to Woodrow W. George, Kansas City, Kans., Joseph F. Kolich, Kansas City, Mo., and Luther Ray Hobbs, Lenexa, Kans.

Application May 8, 1948, Serial No. 25,945

9 Claims. (Cl. 216—1)

This invention relates to improvements in a device for turning and labeling bags.

The present invention contemplates the provision of a machine operable to pneumatically turn a bag of fabric material right side out, and then to automatically apply a label to the face thereof preparatory to filling.

The principal object of this invention is the provision of a pair of cylindrical drums rotatably mounted in parallel relation, and adapted to have a partial vacuum formed therein, whereby when an inlet valve formed in the periphery of one of said drums is opened in communication with a chute to which is attached the open mouth of a bag, said bag will be turned right side out as it is drawn into said tube, where it will be engaged by grippers carried by said drum and secured to rotate with the drum.

Another object of the present invention is the provision of a labeling drum adapted to pneumatically support a label on its periphery as it is coated with an adhesive and applied to a bag carried by a rotating drum disposed in opertive relation thereto.

A further object is the provision of a bag turning means including a bag engaging mouthpiece adjustably operable to engage and release bags of different widths.

Other objects are compactness and sturdiness of construction, ease and efficiency of operation and adaptability for use in turning and labeling bags made of substantially any size and from any type of fabric material.

With these objects in view as well as other objects which will appear during the course of the specification, reference will be had to the drawings, wherein:

Fig. 5 is a cross sectional view taken on line V—V of Fig. 1.

Fig. 6 is a detached plan view of the bag carrying drum.

Fig. 7 is a detached plan view of the label carrying drum.

Fig. 8 is an enlarged cross sectional view of the bag and label carrying drums and their associated parts.

Fig. 9 is a cross sectional view taken on line IX—IX of Fig. 2.

Fig. 10 is a horizontal sectional view taken on line X—X of Fig. 9.

Fig. 11 is an enlarged vertical sectional view taken on line XI—XI of Fig. 9.

Fig. 12 is a perspective view of the bag engaging lip members detached from the machine.

Fig. 13 is an enlarged end elevational view of the drums looking toward the power side of the machine, with some of the associated parts shown.

Figure 1:
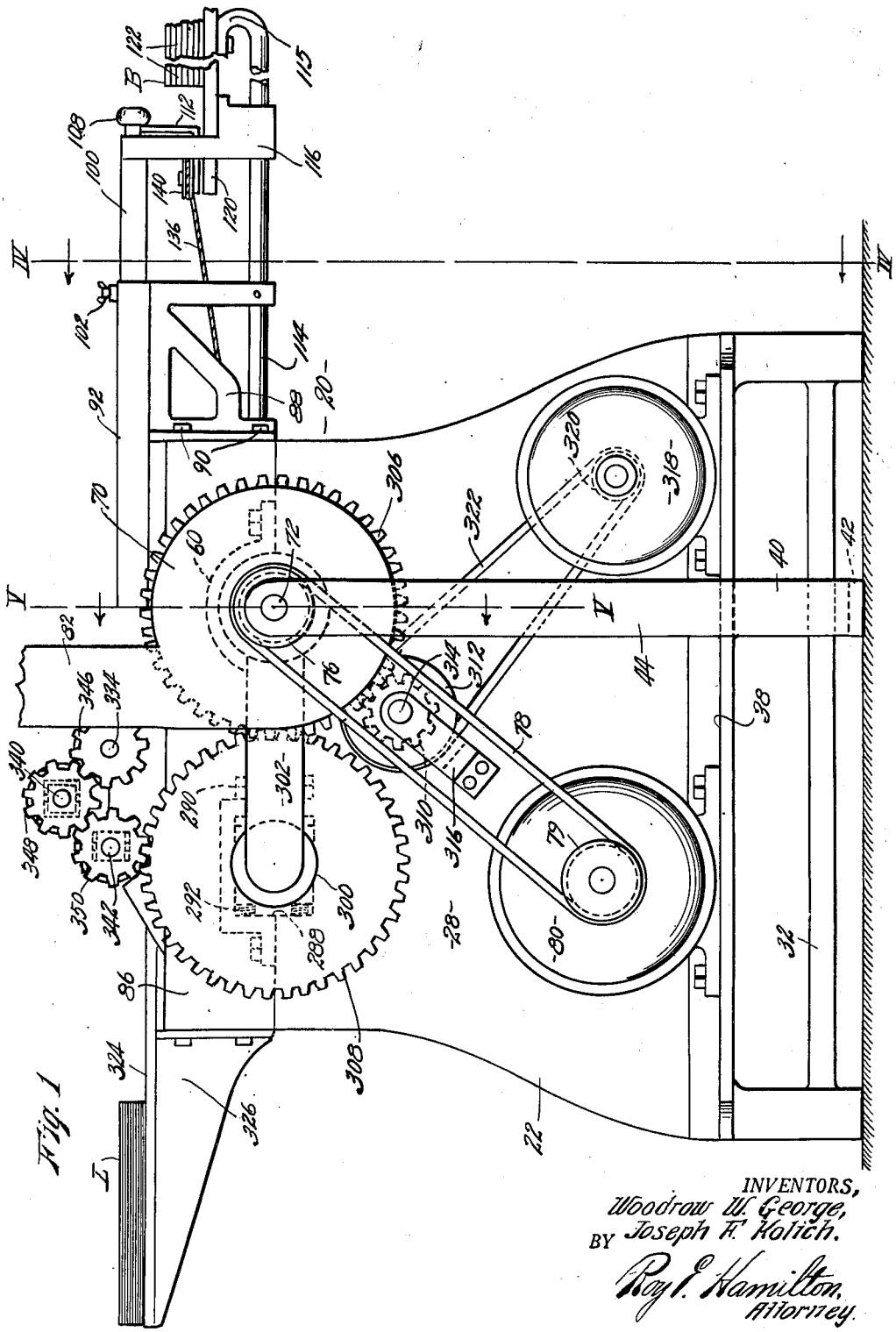
Figure 1 is a side elevation of a bag turning and labeling machine with parts broken away and embodying this invention.

Throughout the several views like reference numerals refer to similar parts and the numeral 20 designates a frame having side standards 22 and 24 joined together adjacent their lower portions by means of transverse end bars 26.

Standard 22 has a substantially closed face 28 upon which certain of the driving parts are attached as hereinafter set forth. The other standard 24 which is on the bag delivery side of the machine is open at 30 and is provided adjacent its base with a crossbar 32 whereby the legs 34 are reinforced. Mounted in face plate 28 is a bar 36 which extends between the standards and into the opening 30 whereby bags B delivered to bar 36 may be manually removed through opening 30 from the machine. Secured to the lower edge of face plate 28 and extending outwardly from the frame 20 is a horizontally disposed shelf 38, having a vertically extending post 40 provided with a foot 42 adapted to rest on the floor and an upper portion 44 adapted to provide a bearing as hereinafter set forth.

A bag carrying drum 46 and a label carrying drum 48 are rotatably mounted in frame 20 with their axes in parallel relation. Drum 46 is provided at its one end with stub axle 50 rigidly secured in axial relation to the drum. This axle is mounted in a bearing 52 formed in the upper surface of standard 24 and having a removable cap 54. The other end of drum 46 is provided with an enlarged hollow axle 56 which is rigidly secured thereto in axial alignment with axle 50. This axle is rotatably mounted in a bearing 58 formed in the upper portion of standard 22 which is provided with a removable cap 60. The outer end of hollow axle 56 is provided with an outwardly projecting annular flange 62 which serves to form a substantially air tight joint with an inturned annular grooved end portion 64 of a tubular inlet pipe 66 of a vacuum pump housing 68 of a vacuum pump 70. This pump is provided with a rotatable axle 72 on which is mounted the propeller blades 74. This axle extends outwardly to bear in the upper end portion 44 of post 40, and is provided intermediate post 40 and pump housing 68 with a sheave wheel 76 which is adapted to operatively receive a belt 78, driven by sheave wheel 79 actuated by motor 80 which is mounted on shelf 38. As the suction pump is operated air is drawn from drum 46 thus creating a partial vacuum therein, and delivering the exhaust air through the exhaust port 82 to any desired point.

Removably mounted on the upper surfaces of standards 22 and 24 is a pair of like bridge members 84 and 86 respectively secured in position by screws 90 to standards 24 and 22.

Figure 3:
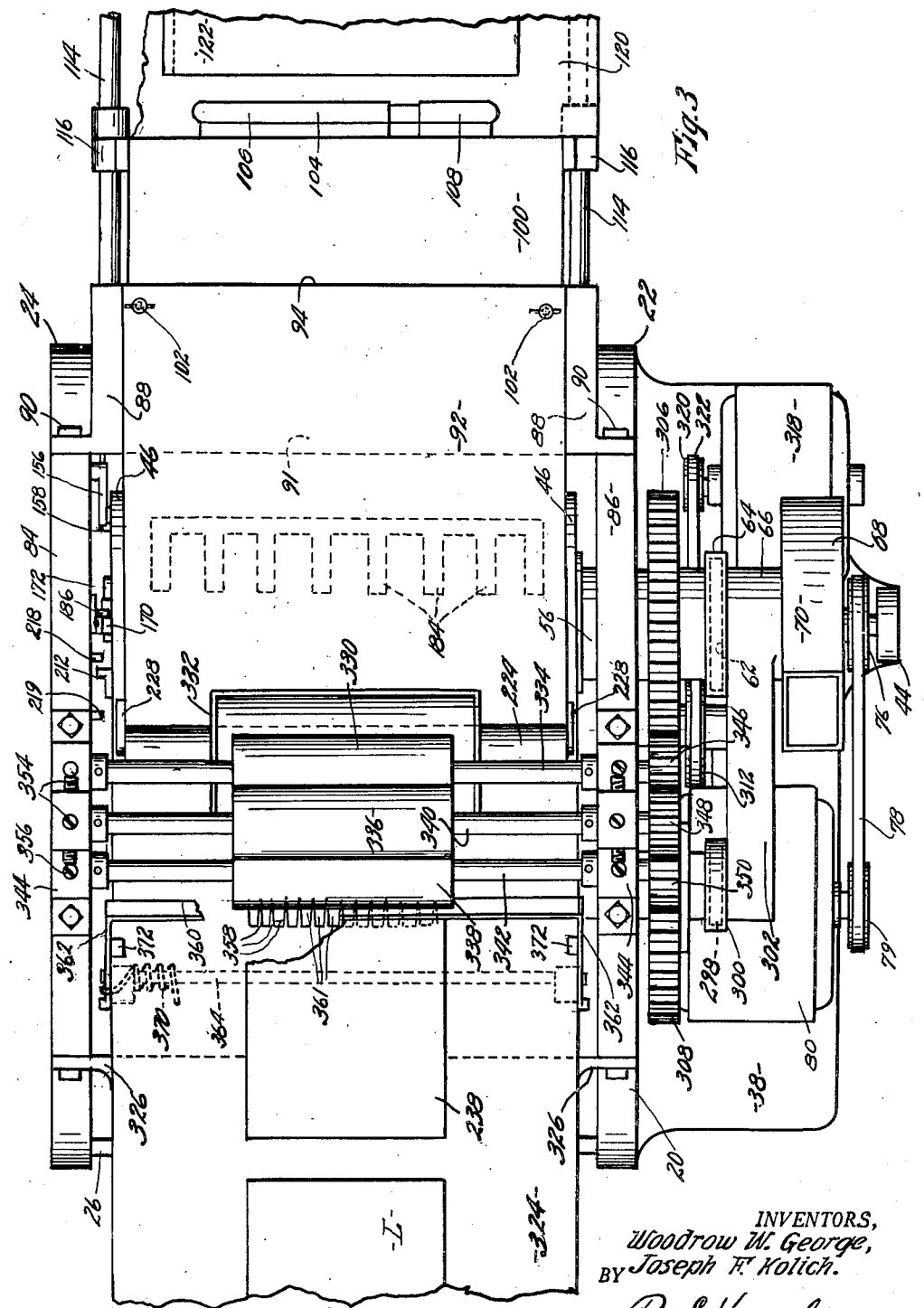
Fig. 3 is a plan view of the device with certain of the parts broken away.
Figure 4:
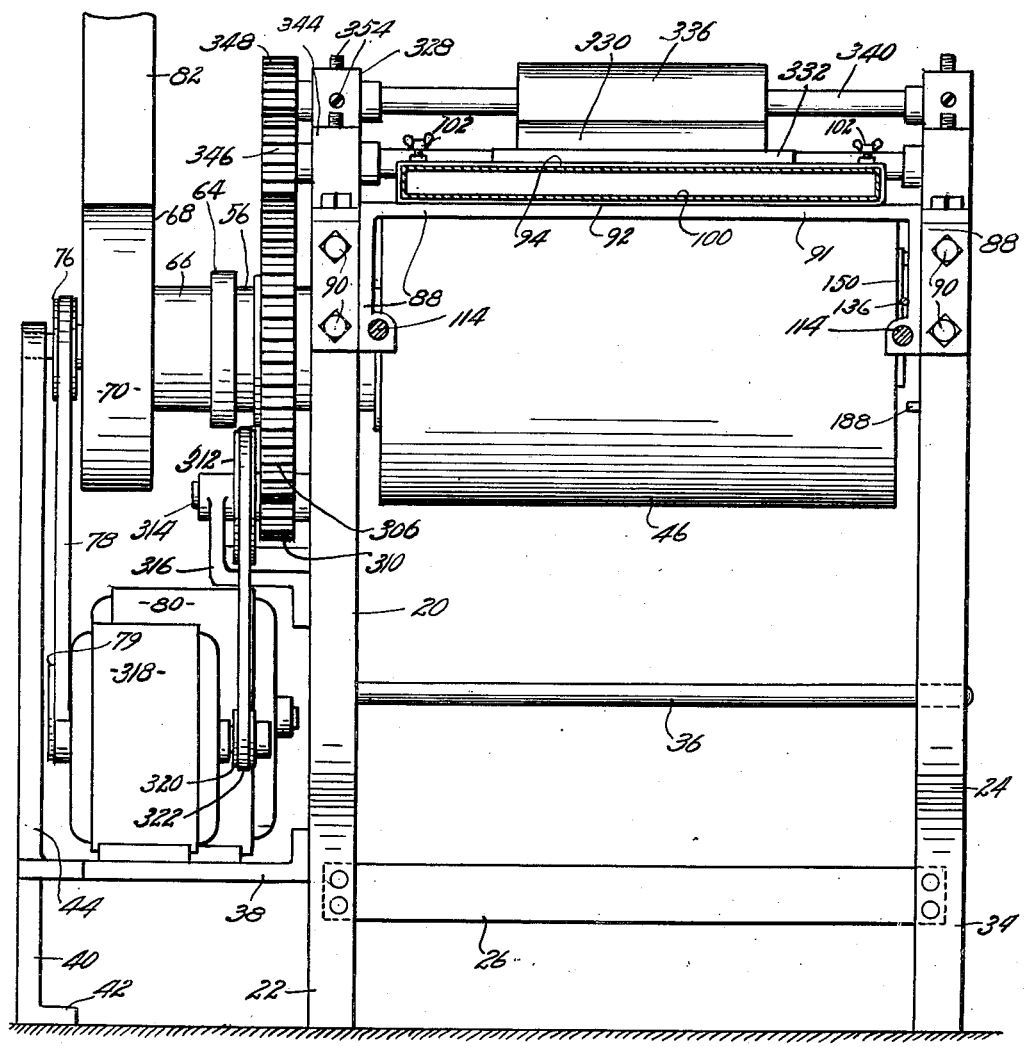
Fig. 4 is a cross sectional view taken on line IV—IV of Fig. 1.

Referring to Figs. 3 and 4, it will be noted that members 84 and 86 are joined together by a bracket member 88 which is secured by screws 90 to the feed end of bridge members 84 and 86, and is provided with a planar member 91 extending entirely across the machine between standards 22 and 24 to serve as a support for the chute 92 which has an open outer end 94 and an inner end portion 96 formed to snugly fit the contour of the bag receiving drum 46. The bottom of chute portion 96 is cut away to form an opening 98 along the periphery of the drum 46 to permit the passageway for air from the chute to the drum as hereinafter described. Chute 92 which is fixed to the frame 20 in operative relation to drum 46 is provided with a telescoping tube section 100 which snugly fits into the outer open end thereof. This tube section is adjustable in chute 92 and may be secured in a predetermined position by means of set screws 102 to accommodate the length of the bag being operated on.

The outer end of tube 100 is provided with an adjustable mouthpiece 104 comprising a pair of slidably mounted bag engaging lip members 106 and 108 fitted into the open outer mouth of tube 100 and telescopingly joined together for longitudinal adjustment transversely of tube 100. Referring to Figs. 9, 10, 11 and 12, it will be noted that each of the lip members 106 and 108 is provided respectively with depending angled members 110 and 112. Slide rods 114 carried by bracket members 88 extend rearwardly of said frame and are disposed in parallel relation at opposite sides of said machine to carry sliding brackets 116 which are secured at their upper ends to the outer end of said telescoping tube 100. Ledges 118 formed on said sliding brackets intermediate their ends serve to support a table 120 which extends outwardly to support a stack of bags 122 at the rear of said adjustable mouthpiece 104 at a convenient position for the operator to feed the mouth of bag B over the mouthpiece. This table is supported adjacent its outer portion by means of the upturned end portions 115 of slide rods 114. It is clearly shown that the feed end of tube 100 is partially closed adjacent its outer side by plates 124. Each of the lip members 106 and 108 are provided with wings 126 at their respective outer ends to be positioned in tube 100 to rest against the inner face of plates 124 to seal the opening as the lip members are adjusted longitudinally during the operation of the machine. This structure of the lip members makes it possible to maintain the tube 100 closed about the lip members as they are longitudinally adjusted relatively to each other.

Figure 2:
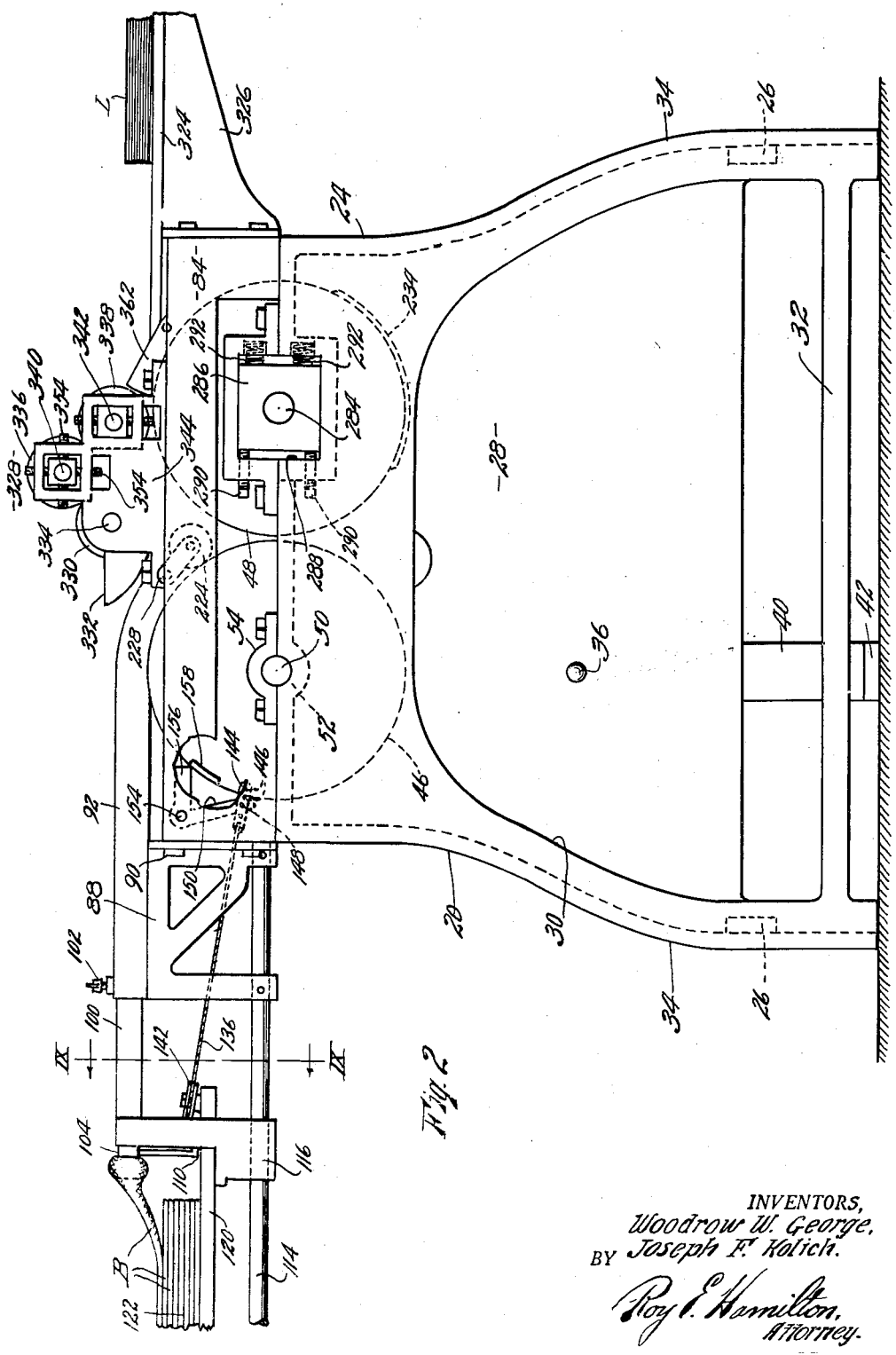
Fig. 2 is an elevational view of the reverse side of the device with parts broken away.

A means to normally urge the bag engaging lips to the extended position comprises a cord 128 having its opposite ends respectively attached to pins 130 secured to the angled member 110 and 112, thence extending outwardly about sheave wheels 132, carried by slide brackets 116 thence between the sheave wheels. The extended helical spring 134 positioned in cord 128 serves to maintain a constant pull tending to move the telescoping bag engaging lips apart. When the operator wishes to position the bag as shown in Fig. 2 he places the open end of the bag over one end of the lips 106 or 108, pulls the bag to extend spring 134 and hooks the other side of the bag over the other lip so that the bag is held under tension tightly about the mouthpiece with the open end of tube 100 otherwise closed. Automatic means is provided whereby the grip of the mouthpiece is released from the sack to permit free movement of the sack with the drum 46 as it grips thereto as hereinafter described.

This means comprises an operating cord 136 secured at its one end to pin 138 mounted in angled member 110, passed around a sheave wheel 140 rotatably carried by angled member 112 thence reverses its direction to pass over a sheave wheel 142 mounted on table 120. The outer end of cord 138 is secured to a bar 144, provided with a series of perforations 146 to selectively receive a pin 148, mounted in one leg 150 of a bell crank lever 152 pivoted at 154 to bridge member 84. The other leg 156 extends into the path of a cam member 158 carried by the end portion of drum 46 whereby at each revolution of drum 46 the lips 106 and 108 will be telescoped inwardly against the action of spring 134 to release their grip on the bag being turned and labeled. By adjusting the bar 144 along leg 150 to selectively position the pin 148 in the desired hole 146 the length of the operating cord 136 may be set to suit the length of the sack being worked on. Spring 134 will function to normally maintain cord 136 taut and the lever arm 156 in the path of travel of cam 158.

Referring now to bag drum 46, reference will be had to Figs. 6, 8 and 13 which show the parts in their relative positions just after the turned closed end of the bag has been gripped.

The bag gripping means 160 is positioned below the periphery of the drum and comprises a rod 162 rotatably mounted in the radial walls of said drum to rest in a recess 164, formed in the periphery of the drum, in parallel relation with the axis of said drum. This rod is provided with a series of bag gripping tongues 166 spaced between guard members 168 which serve to prevent the bag from interfering with the proper operation of tongues 166.

Rod 162 extends through the end wall 47 of the drum 46 and is provided with an operating arm 170 which is held in one of two normal positions by a detent spring 172. Detent spring 172 is secured in position to the end wall 47 by means of pins 174 and 176 and is provided at its free end portion with oppositely inclined sections 178 and 180. As shown in Fig. 8 the operating arm 170 is shown resting against the section 178 of arm 170 to resiliently urge the tongues 166 tightly against the closed end of bag B.

It will be noted that the recess 164 is recessed in offset relation at one of its edges to form a ledge 182 upon which the bag rests as it is being held by tongues 166, thus permitting the tongues to rest below the periphery of said drum so as not to interfere with the further operation of labeling.

It will be noted, as clearly shown in Fig. 8, that chute 92 is provided with a series of depending resilient fingers 184 which tend to urge the closed end of bag B downwardly through opening 185 where it may be engaged by tongues 166 as the drum 64 is rotated in an anti-clockwise direction, as indicated by the arrow, when stationary pin 186 carried by bridge member 84 engages operating arm 171 to move it from its position on section 180 of spring 172 over the hump end onto the oppositely inclined section 178 of said spring detent. These tongues will remain in the gripping position until drum 46 has rotated to a position where stationary detent 188 will engage lug 190 integral with arm 170, to move said arm so as to again position said arm against section 180 of spring 172 thus securing the tongues 166 in the open position in recess 164. This operation of the gripping means is repeated at each revolution of the drum.

Just in front of recess 164 is formed a wall 192 protected by peripheral strips 194. Wall 192 is provided adjacent its bottom with valve seats 196 and 198. A valve rod 200 rotatably mounted in the end walls of drum 46 carries valve members 202 and 204. These valve members are so positioned relative to seats 196 and 198 that as rod 200 is rotated anti-clockwise they will move from their seats to open the inlet valve to the interior of drum 46 from which most of the air has been pumped. It will be noted that valve member 202 is considerably larger in area than valve member 204, thus insuring the maintaining of the valve in the closed position so long as the pressure outside the drum chamber is greater than the pressure within said drum chamber. A spring detent 206 mounted on the end 47 of drum 46 by means of pins 208 and 210 serve to bear against the lever arm 212 rigidly mounted on the extended end of rod 200 to maintain the valve in either the open or closed position. This spring detent 206 has a pair of oppositely disposed inclined surfaces 214 and 216. As clearly shown in Fig. 8 when lever 212 rests against spring portion 214 the valve will be held in the open position to allow air to enter into the chamber of drum 46 thus drawing the bag B into chute 92 and in position for gripping by means of tongues 166. The valve is opened by means of stationary detent 218 striking lever 212 as the drum is rotated. Since this valve needs to be opened only for a short period of time, an adjustable pin 219 carried by bridge member 84 engages lever arm 220 to close the valve with operating arm 212 resting on the inclined portion 216 of detent spring 208.

To permit free movement of the bag past the end of chute 92, it will be noted that the top of the portion of the chute is spaced apart from the periphery of drum 46 at 222, however, this opening is normally closed by a roller 224 having an axial pin 226. The roller 224 is hinged to chute member 92 by means of links 228. This roller raises as the sack passes thereunder and then drops down again to close the gap. A series of holes 230 formed concentric about the axis of drum 46 serve to receive pin 188 to permit the proper spacing of the release of gripping tongues 166. Also a series of holes 232 allow for positioning the closing pin 219 for the valve 202.

Referring now to label drum 48, it will be noted that the drum is slightly less in diameter than drum 46, has a peripheral plate 234 of uniform thickness and is secured in position by screws 236. This plate is of suitable size to support a rectangular label 238 that is fed thereon by hand as hereinafter set forth. Plate 234 is slotted at 240 to form a suitable grill 242 which communicates with a well 244 formed inwardly from the periphery of drum 48 by substantially radially disposed walls 246 which carry at their inner edges valve seats 248 and 250. A valve rod 252 mounted for rotation in the end walls of drum 48 carries valve members 254 and 256.

These valve members are positioned relative to the seats 248 and 250 so that when the drum is rotated in the direction indicated by the arrow (see Fig. 8) they will move to and from the completely-closed position. This moving of the valve members is accomplished by means of a lever arm 258 rigidly secured intermediate its ends to the end of valve rod 252 which extends outwardly beyond the end wall of drum 48 to present an inwardly projecting arm 260 and a outwardly projecting arm 262.

Arm 260 always engages detent spring 264 to control the position of the valve members relative to the seats. It will be noted that detent spring 264 is secured in position by means of pins 266 and 268 mounted in end plate 270 of drum 48. Normally the valve members 254 and 256 are held in sealed position against the valve seats by the greater air pressure outside the drum resting against the valve member 254 of greater area to hold it closed.

When the valve members are closed arm 260 rests against the inclined portion 272 of spring 264 which is under tension to always urge the valve members to their seats. When the arm 260 is moved to contact spring portion 271 the valve will be held open.

The outer arm 262 of the valve arm of the valve is operable by a stationary pin 274 carried by bridge member 84 and disposed in one of holes 276 formed in member 74 in concentric relation to drum axes to open said valve.

As drum 48 continues to rotate in the direction indicated by the arrow the end portion 260 of lever 258 will contact stationary pin 278 which is mounted in holes 280 formed in a plate 282 carried by standard 24 and disposed concentrically with the axis of drum 48.

The label drum 48 is provided at its one end with an axle member 284 mounted in adjustable bearing block 286 which is slidably mounted in bearing 288 carried by standard 24. Adjusting screws 290 mounted in bearing 288 are operable to vary the distance between drums 46 and 48, and springs 292 mounted in bearing 288 to bear against block 286 constantly urge the block against screws 290, however, when sacks of greater thickness pass between the drums the springs will permit them to separate sufficiently to compensate therefor. The other end of drum 48 is provided with a hollow axle 294 which is rigidly secured thereto in axial alignment with axle 284. This axle is rotatably mounted in a bearing block 296 which is slidably mounted in a bearing 288 provided with adjusting screws and spring similar to the bearing for axle 284, to compensate for the movement of bags of different thicknesses passing between the drums. The outer end of axle 294 is provided with an outwardly projecting annular ring 298, which serves to form a substantially airtight joint with the internally grooved end portion 300 of a conduit 302 which communicates with inlet pipe 66. This connection between drum 48 and inlet pipe 66 permits the drawing of a partial vacuum in drum chamber 304.

The means for driving the two drums 46 and 48 comprise two like spur gears 306 and 308 operatively intermeshed and adjustably mounted on hollow axles 56 and 294 respectively. A spur pinion 310 fixed to sheave wheel 312 and rotatably mounted on stub shaft 314 secured at its one end to standard 22 and at its other end to a bracket 316 secured to standard 22 intermeshes with gear wheel 306. A motor 318 mounted on shelf 38 is provided with a sheave wheel 320 which is operatively interconnected with sheave wheel 312 by means of belt 322.

A table 324 carried by brackets 326 secured by screws 328 to bridge members 84 and 86 serves to carry a stack of labels L, which are adapted to be manually fed to the machine for attachment to the turned bags mounted on drum 46.

Working in conjunction with drum 48 is a paste fountain 328, having a roller 330 mounted in the paste well 332, on shaft 334. Cooperating rollers 336 and 338 mounted respectively on shafts 340 and 342 respectively cooperate to properly distribute the paste to the roller 338 whereby the proper amount is fed to the labels as they pass through the machine as hereinafter described.

All the shafts 334, 340 and 342 are disposed parallel with the axis of drum 48 and are mounted at their opposite ends in like bearings 344.

At the drive side of the machine these shafts 334, 340 and 342 are respectively provided with intermeshing spur gears 346, 348 and 350, which are in planar alignment with gear 308 and with which gear 350 intermeshes to drive the paste rollers. Paste well 332 is supported on a cross bar 352 mounted on bridge members 84 and 86.

To provide for relative adjustment of the paste feed rollers shaft 340 is so mounted and provided with adjusting screws 354 so that it may be adjusted universally. Roller shaft 342 is mounted and provided with adjusting screws 356 for vertical adjustment. By this adjustment of the rollers the amount of paste delivered to the label may be varied by the operator.

Referring to Figs. 3 and 8 it will be noted that the forward edge of table 324 is formed to present comb teeth 358 adjacent the periphery of paste roller 338, to present slots 361 beneath the positioned label 238 against drum segment 234 whereby the label will travel with the drum beneath pasting roller 338 to receive a coat of paste thereon. After the label is rolled onto the bag the valve 254 is closed by stationary pin 278.

To facilitate the proper positioning of the label relative to the drum, and to release the label at the right time, a stop bar 360 is provided having right angled arms 362 by means of which the stop bar is attached to the pivotally mounted shaft 364. One of arms 362 has a depending operating arm 366 which extends into the path of travel of a cam 368 carried by the end wall 270 of drum 48. A coil spring 370 mounted about shaft 364 has its end portions anchored in such a manner as to constantly urge the bar 360 downwardly to serve as a stop to limit the forward movement of label 238.

In the operation of the machine cam 368 engages arm 366 to raise the bar 360 above table 324 against the action of spring 370 to release the label. Stops 372 integral with side arms 362 normally rest on top of table 324 to limit the downward movement of stop bar 360.

What we claim is:

1. A machine of the character described comprising a frame, a pair of parallel, closely spaced hollow drums carried for rotation by said frame, means for exhausting air from the first of said drums, an air inlet valve at the periphery of said first drum, a bag chute carried by said frame, said chute having its mouth closely associated with said chute and having its opposite end adapted to engage the open end of a wrong side out bag, means for rotating said drums in opposite directions, means operable by the rotation of said first drum whereby said inlet valve is opened as it passes over the mouth of said chute, whereupon air moving into said drum through said chute will cause said bag to be drawn right side out into said chute, means carried by said first drum and operable by the rotation thereof to engage and grip the closed end of said bag whereby said bag is caused to rotate with said drum, means associated with the second of said drums and operable by the rotation thereof to position a label on the face of said bag, and means for synchronizing the rotational speeds of said drums whereby said label is always positioned in the same relative position on said bag.

2. A machine of the character described comprising a frame, a pair of parallel, closely spaced hollow drums carried for rotation by said frame, means for exhausting air from the first of said drums, an air inlet valve at the periphery of said first drum, a bag chute carried by said frame, said chute having one end closely associated with said chute, means carried at the outer end of said chute for releasably gripping the open end of a wrong side out bag, means for rotating said drums in opposite directions, means operable by the rotation of said first drum whereby said inlet valve is opened as it traverses the end of said chute, whereupon air entering said first drum through said chute will cause said bag to be drawn right side out into said chute, means carried by said first drum and operable by the rotation thereof to engage and grip the closed end of said bag, means operable by the rotation of said first drum to simultaneously release the bag gripping means at the outer end of said chute, thereby permitting said bag to rotate with said drum, means associated with the second of said drums and operable by the rotation thereof to apply a label to the face of said bag, and means for synchronizing the speed of said drums whereby said label is always placed in the same relative position on said bag.

3. A machine of the character described comprising a frame, a pair of parallel, closely spaced hollow drums carried for rotation by said frame, means for rotating said drums in opposite directions, means for exhausting air from both of said drums, an air inlet valve carried at the periphery of each of said drums, a bag chute carried by said frame having its one end closely associated with the first of said drums and being adapted at its opposite end to engage the open end of a wrong side out bag, means operable by the rotation of said first drum whereby the inlet valve thereof is opened as it traverses the end of said chute, whereupon air moving into said drum through said chute will cause said bag to be drawn right side out into said chute, means carried by said first drum and operable by the rotation thereof to grip the closed end of said bag whereby said bag is caused to rotate with said drum, means operable by the rotation of the second of said drums whereby the inlet valve thereof is opened and the resulting air suction positions a label on said second drum, whereupon said label is positioned on the face of said bag, means for synchronizing the speed of said drums, and means operable by the rotation of said first drum to release the bag gripping means carried by said first drum after the label has been applied to the bag.

4. A machine of the character described comprising a frame, a hollow drum carried rotatably by said frame, means for rotating said drum, means for exhausting air from said drum, said drum having an air inlet in the periphery thereof, a valve for said inlet, a bag chute carried by said frame and having its mouth closely associated with said drum, and having its opposite end so formed that the open end of a wrong side out bag may be fitted thereover, a valve actuating member carried by said frame and operable by the rotation of said drum whereby said inlet valve is opened as said inlet traverses the mouth of said chute, whereby air entering said drum through said chute will cause said bag to be drawn right side out into said chute, and bag gripping members carried by said drum, and an actuating member carried by said frame and operable by the rotation of said drum to actuate said gripping members to grip the closed end of said bag and draw said bag through said chute.

5. A machine of the character described comprising a frame, a hollow drum carried rotatably by said frame, means for rotating said drum, means for exhausting air from said drum, said drum having an air inlet in the periphery thereof, a valve for said inlet, a bag chute carried by said frame and having its mouth closely associated with said drum, a resiliently expansible mouthpiece carried at the opposite end of said chute over which the open end of a wrong side out bag may be positioned, a valve actuating member carried by said frame and operable by the rotation of said drum whereby said inlet valve is opened as said inlet traverses the mouth of said chute, whereby air entering said drum through said chute will cause said bag to be drawn right side out into said chute, bag gripping members carried by said drum, and an actuating member carried by said frame and operable by the rotation of said drum to actuate said gripping members to grip the closed end of said bag, and means operable by the rotation of said drum to simultaneously contract said mouthpiece to release the open end of the bag, whereupon said bag is withdrawn from said chute.

6. A machine of the character described comprising a frame, a hollow drum carried rotatably by said frame, means for rotating said drum, means for exhausting air from said drum, said drum having an air inlet in the periphery thereof, a valve for said inlet, a bag chute carried by said frame and having its mouth closely associated with said drum, a resiliently expansible mouthpiece carried at the opposite end of said chute over which the open end of a wrong side out bag may be positioned, means for adjusting the length of said chute, a valve actuating member carried by said frame and operable by the rotation of said drum whereby said inlet valve is opened as said inlet traverses the mouth of said chute, whereby air entering said drum through said chute will cause said bag to be drawn right side out into said chute, bag gripping members carried by said drum, and an actuating member carried by said frame and operable by the rotation of said drum to actuate said gripping members to grip the closed end of said bag, and means operable by the rotation of said drum to simultaneously contract said mouthpiece to release the open end of the bag, whereupon said bag is withdrawn from said chute.

7. A machine of the character described comprising a frame, a hollow drum carried rotatably by said frame, means for rotating said drum, means for exhausting air from said drum, said drum having an air inlet in the periphery thereof, a valve for said inlet, a bag chute carried by said frame and having its mouth closely associated with said drum, and having its opposite end so formed that the open end of a wrong side out bag may be fitted thereover, a valve actuating member carried by said frame and operable by the rotation of said drum whereby said inlet valve is opened as said inlet traverses the mouth of said chute, whereby air entering said drum through said chute will cause said bag to be drawn right side out into said chute, gripping tongues carried movably by said drum and operable to grip the closed end of said bag to draw said bag through said chute, and an actuating member carried by said frame and operable by the rotation of said drum to actuate said tongues.

8. A machine of the character described comprising a frame, a pair of parallel, closely spaced hollow drums carried for rotation by said frame, means for rotating said drums in opposite directions, means for exhausting air from both of said drums, an air inlet valve carried at the periphery of each of said drums, a bag chute carried by said frame having its one end closely associated with the first of said drums and being adapted at its opposite end to engage the open end of a wrong side out bag, means operable by the rotation of said first drum whereby the inlet valve thereof is opened as it traverses the end of said chute, whereupon air moving into said drum through said chute will cause said bag to be drawn right side out into said chute, means carried by said first drum and operable by the rotation thereof to grip the closed end of said bag whereby said bag is caused to rotate with said drum, means operable by the rotation of the second of said drums whereby the inlet valve thereof is opened and the resulting air suction positions a label on said second drum, a pasting roll carried by said frame over which said label is moved by said second drum, further rotation of said second drum positioning said label on said bag, and means for synchronizing the speed of the drums whereby the label is always placed in the same relative position on said bag.

9. A machine of the character described comprising a frame, a pair of parallel, closely spaced hollow drums carried for rotation by said frame, means for rotating said drums in opposite directions, means for exhausting air from both of said drums, an air inlet valve carried at the periphery of each of said drums, a bag chute carried by said frame having its one end closely associated with the first of said drums and being adapted at its opposite end to engage the open end of a wrong side out bag, means operable by the rotation of said first drum whereby the inlet valve thereof is opened as it traverses the end of said chute, whereupon air moving into said drum through said chute will cause said bag to be drawn right side out into said chute, tongues carried movably by said first drum and operable by the rotation thereof to grip the closed end of said bag whereby said bag is carried to rotate with said drum, means operable by the rotation of the second drum to open the inlet valve thereof, whereupon the resultant suction at said inlet removes a label from a support carried by said frame and holds it firmly against said second drum, a paste roll carried by said frame over which said label is moved by said second drum, further rotation of said second drum applying said label to the face of said bag, means for closing the inlet valve of said second drum as said label is applied to said bag, and means for releasing said tongues after said label is applied to said bag.

WOODROW W. GEORGE.
JOSEPH F. KOLICH.

REFERENCES CITED

The following references are of record in the file of this patent:

UNITED STATES PATENTS

| Number | Name | Date |
|---|---|---|
| 604,855 | Cowles et al. | May 31, 1898 |
| 783,444 | Lester | Feb. 28, 1905 |
| 1,320,961 | Anderson | Nov. 4, 1919 |
| 1,465,200 | Yates | Aug. 14, 1923 |
| 1,949,158 | Gay | Feb. 27, 1934 |
| 2,033,849 | Mudd | Mar. 10, 1936 |